United States Patent [19]

Hu et al.

[11] Patent Number: 4,842,889
[45] Date of Patent: Jun. 27, 1989

[54] METHOD FOR PREPARING LUBRICATED SURFACES

[75] Inventors: Can B. Hu; Donald D. Solomon, both of Spring Valley; Victor A. Williamitis, Dayton, all of Ohio

[73] Assignee: Becton, Dickinson and Company, Franklin Lakes, N.J.

[21] Appl. No.: 209,161

[22] Filed: Jun. 16, 1988

Related U.S. Application Data

[63] Continuation of Ser. No. 81,200, Aug. 3, 1987, abandoned.

[51] Int. Cl.⁴ .............................................. B05D 3/06
[52] U.S. Cl. ...................................... 427/38; 427/39; 427/296; 427/322
[58] Field of Search ................... 427/38, 39, 296, 322

Primary Examiner—Bernard Pianalto
Attorney, Agent, or Firm—Richard E. Brown

[57] ABSTRACT

A method for lubricating a low surface energy polymeric surface includes plasma treatment of the surface. A film of a polysiloxane lubricant is applied to the plasma-treated surface to give an even coating of the lubricant which is stable for a protracted period of time.

15 Claims, 1 Drawing Sheet

METHOD FOR PREPARING LUBRICATED SURFACES

BACKGROUND OF THE INVENTION

1. Field of the Invention

This invention relates to lubrication of hydrophobic surfaces. More particularly, the invention relates to a method for lubricating a hydrophobic polymeric surface to give an even coat of lubricant which is stable over a protracted period.

2. Background of the Invention

Many devices require lubrication of a surface. In the medical instrumentation and diagnostic field, simple sensing devices such as, for example, thermometers, needles or electrode components of complex monitoring apparatuses must be inserted into a body cavity or through the skin and at a later time withdrawn. Absent effective lubrication which is stable throughout both the insertion and withdrawal stages of the procedure, severe patient discomfort may result.

Other medical devices, such as syringes cannulas and catheters used for sampling or medicament administration, or devices such as burets used in diagnostic procedures, have components which are in sliding contact during use. Such devices require lubrication of the moving parts and may well also require lubrication of an external surface.

In the medical arts, synthetic polymers have come to the fore as materials of choice for fabrication of devices. Although polymers have many salubrious properties which make them useful in medical devices, such as flexibility and biocompatibility consequent to chemical inertness, they have the disadvantage of being materials of low surface energy. One of the otherwise most useful classes of polymers, the perfluorinated hydrocarbons, has the lowest surface energy of any known polymer class.

Lubrication of surfaces of low surface energy is a long-standing problem because of the propensity of lubricants to migrate from surface to surface interfaces or to "bead" on an external surface. Either phenomenon severely limits the effectiveness of a lubricant on a low-energy surfaces.

Migration and beading of a lubricant on a surface are believed to be related to the surface tension of both the lubricant and the surface, and are easily understood with a simple and familiar analogy. Anyone who has ever washed and polished a car has observed water to form discreet drops on the hood after polishing. The same situation may exist when a lubricating oil is applied to a surface. If the lubricant forms beads on the surface or migrates from a surface to surface interface, very ineffective lubrication results.

The antithesis of beading, i.e., the ability of a liquid to spread out and cover a surface is termed wettability and this property is measured by the conventional contact angle formed between the surface and a drop of the liquid applied to the surface. A high contact angle is indicative of beading. Conversely, a low contact angle indicates the desired wetting. Complete spreading giving a uniform coating of the liquid on the surface is indicated by the theoretical contact angle of 0°.

Many attempts to achieve wetting of a surface with a liquid by addition of various surfactants have been reported. This approach has been partially successful with some surfaces, but no surfactant is known which allows formation of a uniform stable coating of a liquid on a perfluorinated surface. Other surface treatments which have been tried are strong acids, oxidizing agents and flame treatments.

Achievement of wettability to water by treatment of polymeric surfaces with an ionizing plasma formed by electromagnetic activation of a gas by either glow discharge or corona discharge is well-known and is summarized by Rose et al. in Proceedings of the SPE 43rd Annual Technical Conference and Exhibition, 1985, page 685. Specific examples of enhancement of water wettability by plasma treatment of a polymeric surface are U.S. Pat. No. 4,445,991 to Arbit and U.S. Pat. No. 4,344,981 to Imada et al. The latter patent discloses that plasma treatment of a silicone surface gives water affinity of short duration, but that plasma treatment followed by treatment with an aqueous solution of a surface active agent gives water affinity of long duration.

U.S. Pat. No. 4,072,269 to Lidel discloses treatment of a polymeric surface with a plasma from an activator gas and a reactive gas whereby surface wettability to water is increased but wettability to an oil is decreased, thereby inhibiting penetration of the oil into the polymer.

Enhancement of ink receptivity rendering polymeric surfaces printable is achieved by plasma treatment in U.S. Pat. No. 4,292,397 to Takeuchi et al.

Auerbach, in U.S. Pat. No. 4,188,426, discloses plasma deposition of a fluorocarbon coating onto an organic or inorganic surface wherein the lubricity, hydrophobicity and coefficient of friction of the resulting fluorocarbon surface are equivalent to those provided by conventional fluorocarbon polymers.

U.S. Pat. No. 4,642,246 to Janssen et al. has recently disclosed an approach to overcoming the problem of loss of lubricant from a magnetic disk by heating a polymeric lubricant having a terminal functional group to covalently bond the lubricant to surface polymers of the disk.

Copending application Ser. No. 036,733, filed Apr. 10, 1987, and having a common assignee herewith, discloses plasma treatment of a surface and lubrication thereof in a method to overcome breakout.

In spite of the vast literature on lubrication, the problem of providing stable lubricated surfaces for devices fabricated from polymeric surfaces of low energy has not yet been solved. It is toward the solution of this long-standing problem that this invention is directed.

SUMMARY OF THE INVENTION

A low energy polymeric surface is lubricated by treating the surface with plasma and lubricating the plasma-treated surface by applying thereto a film of a silicone oil.

Low energy polymeric surfaces, such as polyethylene, polypropylene, or most preferably, a perfluorinated polymer, such as fluorinated ethylene propylene polymer (FEP) are particularly suited to lubrication by the method of the invention.

The choice of lubricant depends on the low energy surface. Preferably, the lubricant has a surface tension substantially the same as, or lower, than the surface energy of the plasma-treated polymeric surface. Most preferably, a polysiloxane lubricant is applied to the plasma-treated surface.

In accordance with the method of the invention, lubricating oils may be applied to the lowest surface energy polymers known, the perfluorinated hydrocarbon polymers exemplified by FEP in uniform fully-spread coatings. The coatings exhibit no tendency to migrate or bead for protracted periods, i.e., they have been observed to be stable for periods of two years or more. Because of the known biocompatibility of silicones, the method of the invention is particularly well-suited, but not limited, to biomedical devices such as needles, syringes, catheters and the like, and greatly extends the usefulness of low-energy polymers in fabrication of such devices.

DETAILED DESCRIPTION OF THE INVENTION

Figure 1:
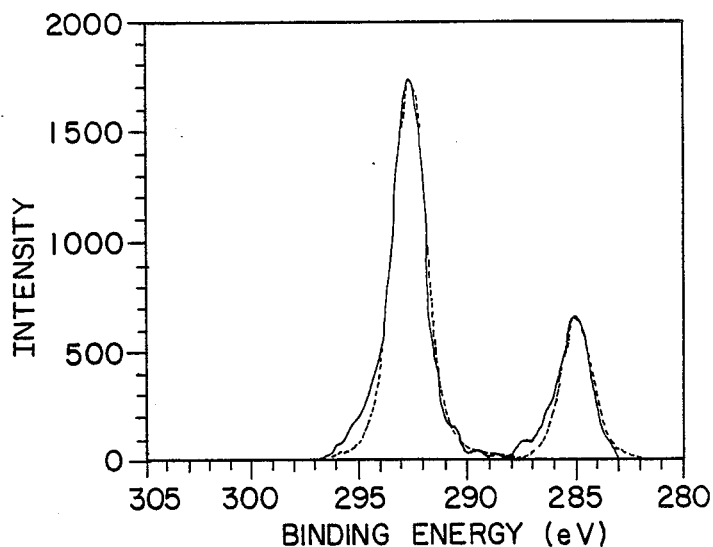
FIG. 1 is an ESCA scan of an untreated FEP surface.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

The present invention overcomes the problems of beading and migration with respect to application of lubricating oils to a surface and provides thereby a method to achieve even coatings of lubricants on materials of low surface energy. The lubricant coatings of the invention are uniform in thickness, cover the entire surface of the material and are stable for protracted periods.

Any material which, when fabricated into a useful device, exhibits a surface of low energy may be lubricated by the method of the invention. Suitable materials, for example, may be metal, glass, ceramic, or preferably, polymers. Representative nonlimiting examples of polymers responsive to the method are polyolefins such as polyethylene, and polypropylene, polystyrene, polyurethane, polyvinyl chloride or copolymers thereof. Particularly preferred surfaces are the perfluorohydrocarbon polymers, as exemplified by polytetrafluoroethylene (Teflon®) and FEP.

In the first step of the preferred method, a perfluorinated polymer surface is treated with a plasma generated from a gas, such as nitrogen neon, argon, xenon, krypton and the like or mixtures thereof. The preferred gas for plasma generation is argon.

The term "plasma" is used generally to describe the state of ionized gas, and consists of positively or negatively charged molecules or atoms, negatively charged electrons as well as neutral species. The plasma may be generated by combustion, flames, physical shock or preferably by electrical discharge, such as a corona or most preferably a glow discharge. Glow discharge is most preferred because it is a cold plasma which does not deform polymeric surfaces of low melting point as may occur when using plasma generated by heat, as coronas.

Any conventional plasma generator, as known in the art, may be used. A typical plasma generator, as, for example, those described in U.S. Pat. No. 3,847,652, consists of a reaction chamber, a high frequency generator and matching network, high vacuum system, gas delivery system and temperature controllers.

A wide range of power settings, radio frequencies, durations of exposure, temperatures, gas pressures and gas flow rates may be used for plasma generation. Ranges for these parameters which provide advantageous results are DC or AC power levels of up to 1000 watts, RF frequency of 0.05 to 50 megaherz, 0.01 to 12 hours, 0° to 200° C., 0.1 to 100 torr and 1–200 cubic centimeters/sec.

The plasma-treated surface thus generated is not lubricious and is not a lubricated surface satisfactory for fabrication of biomedical articles. Lubricity is introduced in the second step of the method of the invention by applying a thin film of a polysiloxane lubricant of surface tension substantially the same or less than the surface energy of the plasma-treated surface.

The preferred lubricant is a silicone oil or mixture thereof having a molecular weight of from about 100 to 1,000,000, preferably from about 1,000 to 100,000.

The most preferred lubricant is a polysiloxane oil or mixture thereof having a molecular weight of from about 100 to 1,000,000, preferably from about 1,000 to 100,000.

The most preferred class of lubricants is the polydialkylsiloxanes of general structure I:

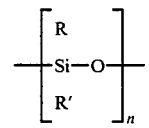

wherein R and R' may be independently a lower alkyl of 1 to 20 carbon atoms, preferably 1 to 8 carbon atoms, or may be joined into a silicon-containing ring of 5 to 8 carbon atoms, and n may be an integer from 1 to 2000, preferably 1 to 800. The preferred lubricants of structure I have viscosities of from about 10 to 100,000, preferably about 100 to 20,000 centistokes.

Application of a film of lubricant to the deposited polymeric surface may be accomplished by any suitable method, as, for example, dipping, brushing, spraying and the like. The lubricant may be applied neat or it may be applied in a solvent, and the solvent subsequently removed by evaporation. The lubricant film may be of any convenient thickness, and in practice, the thickness will be determined by such factors as the viscosity of the lubricant and the temperature of the application. For reasons of economy, the film preferably is applied as thinly as practical, since no significant advantage is gained by thicker films.

Fluorocarbon polymers treated with a plasma and a silicone oil have greatly reduced contact angles between the surface and the oil compared to untreated surfaces. The treated surfaces are fully wettable, and the silicone-wetted surfaces are smooth, even and stable. Table 1 below shows contact angles of beads of silicone fluids of various viscosities on untreated FEP and fully wetted surfaces after argon plasma treatment. It is seen that full wettability by the silicone fluid occurs regardless of the viscosity of the oil.

TABLE 1

| CONTACT ANGLES OF SILICONE FLUID ON THE CONTROL AND ARGON PLASMA TREATED FEP FILMS | | |
|---|---|---|
| VISCOSITY OF | CONTACT ANGLE | |
| SILICONE FLUID (Centistokes) | CONTROL FEP | ARGON PLASMA TREATED FEP |
| 20 | 30 ± 1.7 | Wet |

TABLE 1-continued

CONTACT ANGLES OF SILICONE FLUID ON THE
CONTROL AND ARGON PLASMA TREATED FEP FILMS

| VISCOSITY OF SILICONE FLUID (Centistokes) | CONTACT ANGLE | |
|---|---|---|
| | CONTROL FEP | ARGON PLASMA TREATED FEP |
| 100 | 32.7 ± 0.6 | Wet |
| 1,000 | 34.3 ± 1.2 | Wet |
| 12,500 | 39.0 ± 1.7 | Wet |
| 1,000,000 | Too thick to read accurately | Wet |

Figure 2:
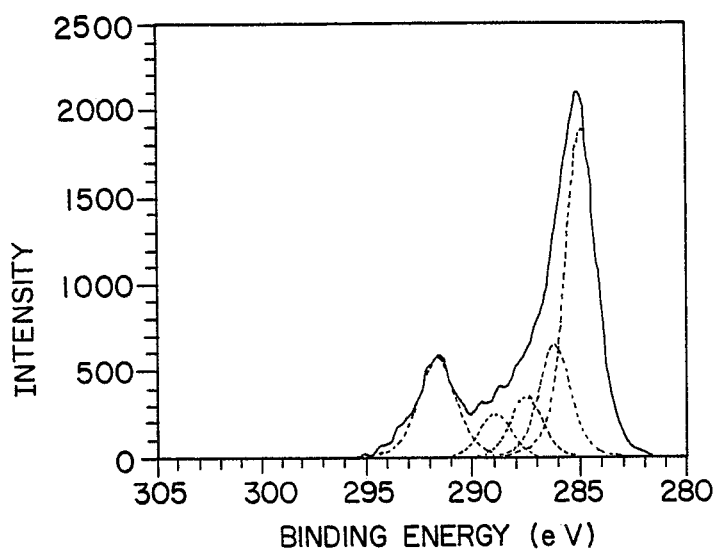
FIG. 2 is an ESCA scan of the FEP surface of FIG. 1 after treatment with an argon plasma.

Studies of FEP surfaces before and after plasma treatment by electron spectroscopy for chemical analysis (ESCA) indicate that changes in surface chemistry are induced by the plasma treatment. Scans of carbon atom of untreated and treated FEP are shown in FIGS. 1 and 2 respectively. In untreated FEP, a major $C_{1s}$ peak at 292 eV and a minor $C_{1s}$ peak at 285.0 eV are observed with no other peak between these two peaks. However, in argon plasma-treated FEP, a major $C_{1s}$ peak at 285.0 eV, a minor $C_{1s}$ peak at 292 eV and a broad peak deconvoluted into three small peaks at 286, 287.5 and 289 eV are observed. The $C_{1s}$ peak at 292 eV clearly originates from the carbon in the carbon-fluorine bonding, while that at 285 eV originates from the carbon in the carbon-carbon bonding. The shift of the major $C_{1s}$ binding energy peak after argon plasma treatment suggests that a significant number of fluorine atoms is cleaved and an increased number of carbon-carbon bonds is formed. The cleavage of fluorine atoms from the argon plasma-treated FEP is confirmed by a sharp decrease in the fluorine atomic ratio from 63% to 19.5% as shown in Table 2. The presence of the small peaks at 286, 287.5 and 289 eV suggests the existence of carbonyl and/or carboxyl groups and/or other mixtures on the FEP surface, most likely caused by the reaction between a trace amount of oxygen and the activated FEP surface during the plasma treatment.

TABLE 2

SURFACE ATOMIC COMPOSITION OF
DIFFERENT PLASMA TREATED FEP FILMS

| # | TYPE OF GAS | POWER (WATT) FREQUENCY OF GENERATOR | SURFACE ATOMIC COMPOSITION DETERMINED BY ESCA, % | | | |
|---|---|---|---|---|---|---|
| | | | $CF_2$ or $CF_3$ | COO $C=O$ CF | C—C | F |
| | CONTROL | | 30.1 | 1.9 | 2.8 | 63.0 |
| 1 | Krypton | 125 50 KHZ | 26.3 | 7.2 | 4.8 | 59.7 |
| 2 | Krypton | 125 13.6 MHZ | 15.8 | 17.8 | 8.1 | 47.4 |
| 3 | Krypton | 250 50 KHZ | 25.1 | 8.0 | 3.5 | 61.4 |
| 4 | Krypton | 500 50 KHZ | 26.8 | 8.4 | 0.7 | 63.1 |
| 5 | Krypton | 300 13.6 MHZ | 20.3 | 13.9 | 10.7 | 48.0 |
| 6 | Nitrogen | 125 50 KHZ | 25.7 | 5.2 | 5.7 | 59.1 |
| 7 | Argon | 125 13.6 MHZ | 11.7 | 21.9 | 32.3 | 19.5 |

Measurement of the thermal transition temperature (Tm) before and after plasma treatment reveals an approximately 6° C. increase in Tm consequent to the plasma treatment. The increase in Tm after plasma treatment is believed to indicate that the carbon cross-linking might have occurred not only in the outer surface but also in the deeper layers.

The preferred argon plasma-treated surfaces of the invention are stable, i.e., remain fully wettable by silicone oil for periods of two years or more. Table 3 shows ESCA data after 21 months storage for comparison with the ESCA data on the initial argon plasma-treated FEP surface (entry 7 of Table 2). It is seen that the surface composition is substantially the same after 18 and 21 months.

TABLE 3

SURFACE ATOMIC COMPOSITION OF ARGON
PLASMA-TREATED FEP FILMS BY ESCA STUDY

| Surface Atomic Composition | Percentage After Storage | |
|---|---|---|
| | 18 months | 21 months |
| C as $CF_2$ or $CF_3$ | 9.9 | 8.8 |
| C as COO, Co or CF | 22.9 | 19.0 |
| C as C - C | 31.5 | 40.5 |
| F | 20.9 | 18.9 |
| O | 13.0 | 12.8 |

EXAMPLE I

Plasma Treatment

FEP was treated with an argon plasma using a Plasma-Therm, Inc. (Kresson, NJ) model 2430 unit. Argon gas at 0.3 torr was passed between two external capacitive excitation plates. Gas excitation took place at a net RF power not exceeding 500 watts, delivered from the ratio-frequency generator. After reacting on the sample surface, the flowing gas was deactivated and passed out of the exhaust system as neutral gas along with any other product gases. The chamber temperature was controlled by the circulating fluid which acts as a heat sink on which the polymers rest.

EXAMPLE II

Determination of Contact Angles

Contact angles of plasma-treated and untreated samples were measured by an NRL contact angle goniometer (Model 100-00). Three ul of silicone oil was used in each of these measurements. The value reported in each sample was the average of at least five measurements.

EXAMPLE III

Surface Characterization After Plasma-Treatment

The FEP surface of Example I was evaluated by ESCA with an AEI-100 photoelectron spectrometer modified to include a 20 liter/sec turbomolecular pump and a 110 liter/sec ion pump to speed up the evacuation and minimize the contamination of the sample chamber. The window was set set at 20 eV for all the elements to obtain a better resolution. A scanning rate of 2 eV/sec was used for all experiments.

Thermal transition temperatures were measured using a Perkin-Elmer DSC-IV. The heating rate was 10° C./min. The sample weight was approximately 10–15 mg. All the temperatures reported were the first runs of samples in order to eliminate any heat history.

What is claimed is:

1. A method for preparing a lubricated surface comprising treating a perfluorinated polymeric surface with a plasma generated from a gas to give a plasma-treated polymeric surface and applying thereto by a process other than plasma deposition a film of a polydialkylsiloxane lubricant, said film having a surface tension substantially the same as or less than the surface energy of said plasma-treated surface, said film thereby fully wetting said plasma treated surface.

2. The method in accordance with claim 1 wherein said polymeric surface is selected from the group consisting of polyethylene, polypropylene, polyurethane, polystyrene, polyvinylchloride, polytetrafluoroethylene and fluorinated ethylene propylene polymer.

3. The method in accordance with claim 1 wherein said gas is selected from the group consisting of nitrogen, argon, neon, xenon, krypton and mixtures thereof.

4. The method in accordance with claim 1 wherein said treating step includes generating plasma with a radio frequency of 0.05 to 50 megaherz.

5. The method in accordance with claim 1 wherein said treating step includes generating plasma at a radio frequency of about 13.56 megaherz.

6. The method in accordance with claim 1 wherein said treating step includes generating plasma at a power of from about 1 to 1000 watts.

7. The method in accordance with claim 1 wherein said treating step includes generating plasma at a temperature of 0° to 200° C.

8. The method in accordance with claim 1 wherein said treating step includes generating plasma at a pressure of 0.1 to 100 torr.

9. The method in accordance with claim 1 wherein said treating step includes generating plasma at a gas flow rate of 1 to 200 cubic centimeters per second.

10. The method in accordance with claim 1 wherein said treating step includes maintaining the plasma for 0.01 to 12 hours.

11. The method in accordance with claim 1 wherein said polydialkylsiloxane has the formula

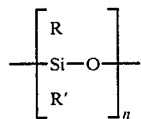

wherein R and R' may independently be an alkyl group of 1 to 20 carbon atoms or are joined into a ring of 5 to 8 carbon atoms and n is an integer of from 1 to 2000.

12. The method in accordance with claim 11 wherein said polydialkylsiloxane is a polydimethylsiloxane.

13. The method in accordance with claim 11 wherein said lubricant has a viscosity from about 10 to 100,000 centistokes.

14. A method for preparing a lubricated surface comprising treating a polymeric surface with a plasma to give a plasma-treated polymeric surface and applying thereto by a process other than plasma deposition a film of a polydialkylsiloxane lubricant, said film having a surface tension substantially the same as or less than the surface energy of said plasma treated surface, said film thereby fully wetting said plasma treated surface.

15. A method for preparing a lubricated perfluorinated polymeric surface comprising:
(a) subjecting a perfluorinated polymeric surface to an ionizing plasma generated by passing a radio frequency discharge of 50 kilohertz through argon to give a plasma-treated perfluorinated polymeric surface; and
(b) applying to said plasma-treated perfluorinated polymeric surface by a process other than plasma deposition a film of polydialkylsiloxane lubricant, said film of polydialkylsiloxane lubricant having a surface tension substantially the same as or less than the surface energy of said plasma-treated surface, said film thereby fully wetting said plasma treated surface.

* * * * *